No. 787,634. PATENTED APR. 18, 1905.
G. H. PARKER & W. A. TWISS.
WEFT REPLENISHING MECHANISM FOR LOOMS.
APPLICATION FILED AUG. 5, 1903.
4 SHEETS—SHEET 3.
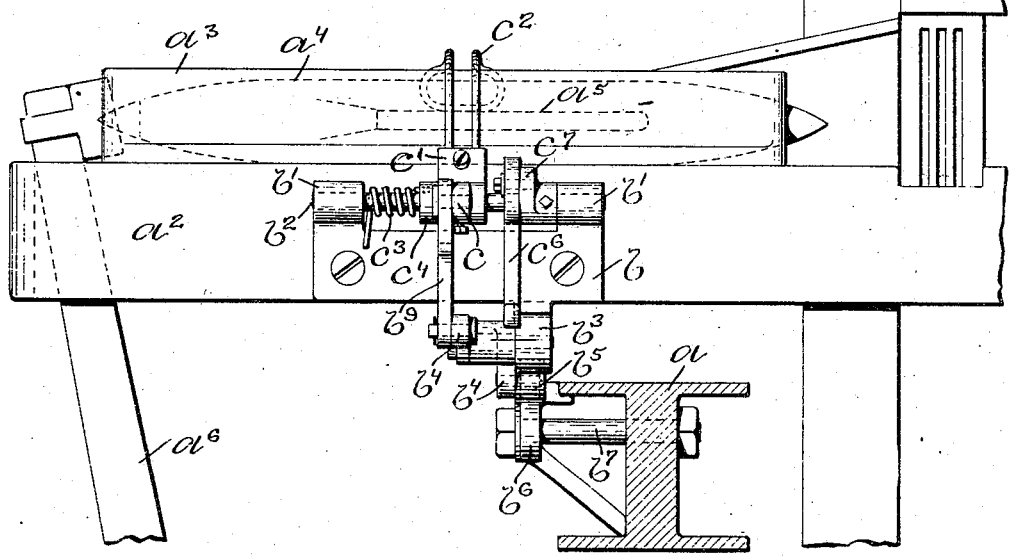
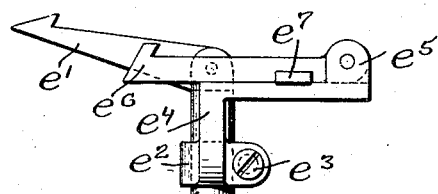
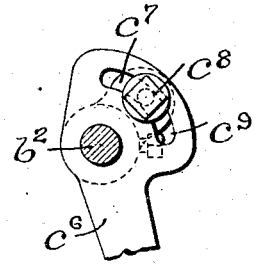
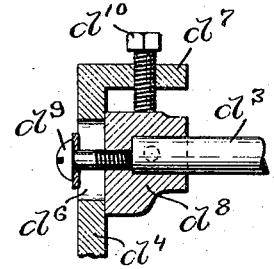
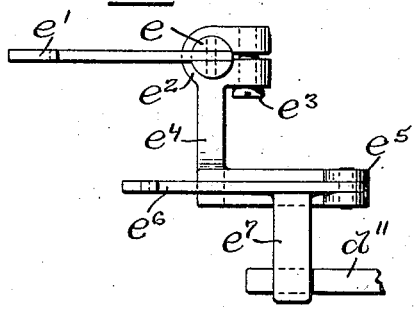
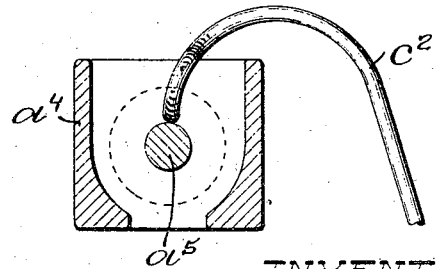
WITNESSES: INVENTORS:

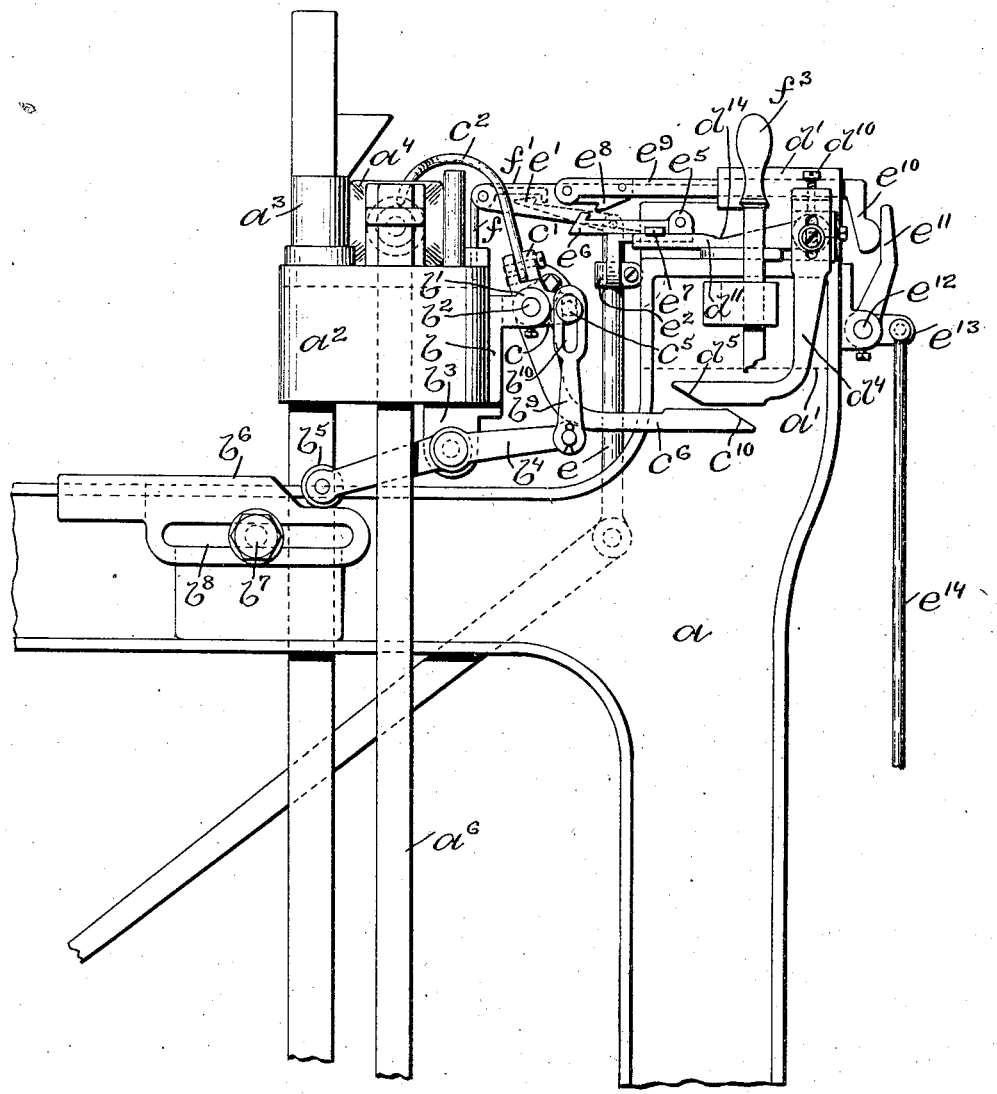

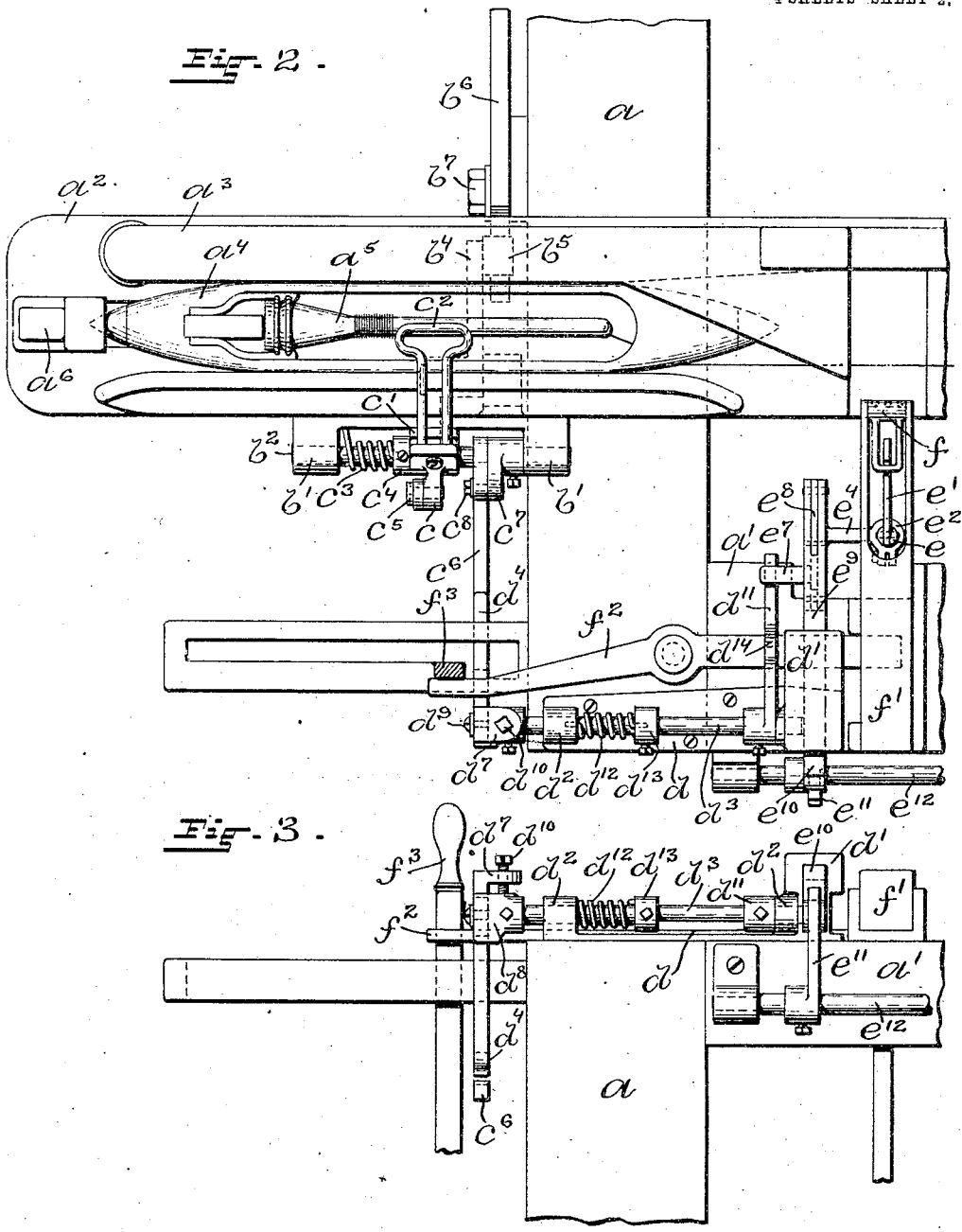

No. 787,634. PATENTED APR. 18, 1905.
G. H. PARKER & W. A. TWISS.
WEFT REPLENISHING MECHANISM FOR LOOMS.
APPLICATION FILED AUG. 5, 1903.

4 SHEETS—SHEET 4.

WITNESSES:
Chas. H. Luther
Ada E. Hagerty

INVENTORS:
George H. Parker
William A. Twiss
by Joseph A. Miller & Co.
ATTORNEYS No. 787,634. Patented April 18, 1905.

UNITED STATES PATENT OFFICE.

GEORGE H. PARKER AND WILLIAM A. TWISS, OF NEW BEDFORD, MASSACHUSETTS.

WEFT-REPLENISHING MECHANISM FOR LOOMS.

SPECIFICATION forming part of Letters Patent No. 787,634, dated April 18, 1905.

Application filed August 5, 1903. Serial No. 168,301.

*To all whom it may concern:*

Be it known that we, GEORGE H. PARKER and WILLIAM A. TWISS, citizens of the United States, residing at New Bedford, in the county of Bristol and State of Massachusetts, have invented a new and useful Improvement in Weft-Replenishing Mechanism for Looms, of which the following is a specification.

This invention has reference to an improvement in looms, and more particularly to an improvement in weft-replenishing mechanism for looms known as "automatic" or "continuous" running looms.

The object of our invention is to replace the old bobbin with a full bobbin just before the weft-thread on the old bobbin has run out; and a further object of our invention is to stop the loom when the weft-thread breaks, thus preventing faulty or bad places in the cloth.

Our invention consists in the peculiar and novel construction of mechanism on the lay of the loom in operative connection with mechanism on the breast-beam, weft-fork hammer, a slide, and a rock-shaft connecting with the automatic bobbin-changing mechanism, whereby the automatic bobbin-changing mechanism is operated to eject the old bobbin from the shuttle just before it has run out, to replace it with a full bobbin, and to stop the loom if the weft-thread breaks by the weft-fork and its connections to the shipper-lever, as will be more fully set forth hereinafter.

Figure 10:
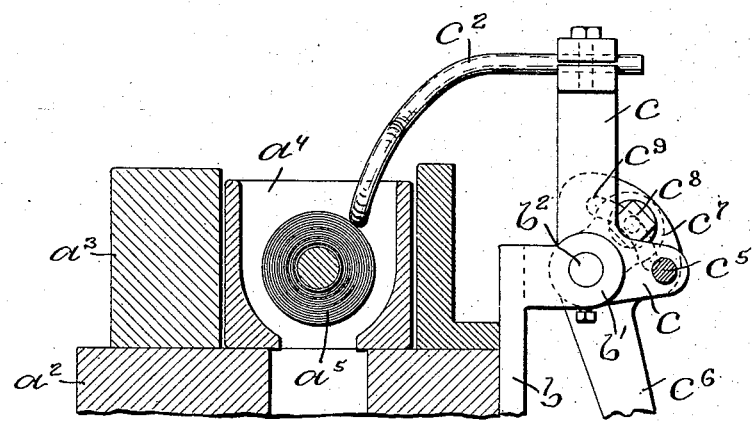
Figure 11:
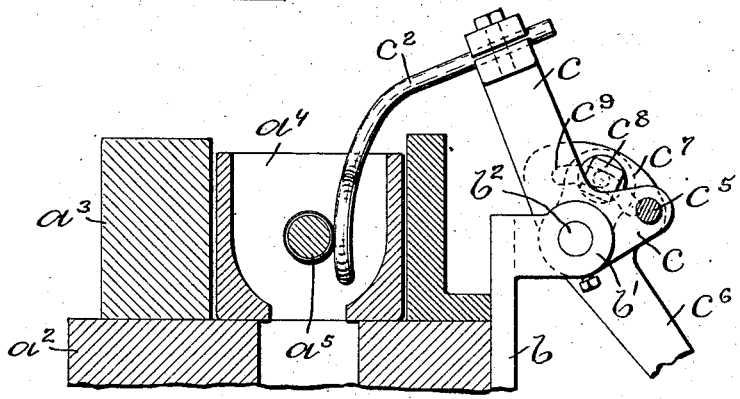

Figure 1 is a left-hand side view showing enough of a loom to clearly show our invention. Fig. 2 is a plan view of Fig. 1, showing the open-top shuttle-box and our improved mechanism on the lay and breast-beam in operative connection when the lay is in its forward position. Fig. 3 is a view looking at the front of the breast-beam, showing the mechanism attached to the breast-beam. Fig. 4 is a view looking at the front of the lay and shuttle-box, showing the mechanism connected with the lay. Fig. 5 is an enlarged detail view of the upper end of the weft-hammer, showing the hook to operate the bobbin-changing mechanism and the hook to operate the weft-fork slide. Fig. 6 is a plan view of the upper end of the weft-hammer. Fig. 7 is a detail view of the adjusting mechanism for adjusting the position of the connecting-arm operated by the feeler-arm. Fig. 8 is a detail sectional view of the means for adjusting the operating-arm on the lifting-lever shaft. Fig. 9 is a transverse sectional view through the shuttle, showing the upper end of the feeler-arm in contact with the bobbin in the shuttle. Fig. 10 is an enlarged detail sectional view through the shuttle-box and shuttle, showing a modified form of feeler-arm in its normal or inoperative position; and Fig. 11 is a view similar to Fig. 10, showing the position the modified form of feeler-arm would assume when the filling on the bobbin is nearly exhausted, allowing the feeler-arm to go by the bobbin.

In the drawings, $a$ indicates the loom side, $a'$ the breast-beam, $a^2$ the lay, $a^3$ the open-top shuttle-box, $a^4$ the shuttle, having means for detachably securing the bobbin $a^5$, and $a^6$ the picker-stick of a loom. On the face of the lay, in front of the shuttle-box, we secure the plate $b$, having the bearings $b'$ $b'$ for the rock-shaft $b^2$, and the downwardly-extending lug $b^3$, forming a support for the arm $b^4$, which is pivotally secured near its center to the lug $b^3$ and has on its rear end the roll $b^5$, working on the cam-plate $b^6$, adjustably secured to the side frame $a$ of the loom by the bolt $b^7$ extending through the side frame and the slot $b^8$ in the cam-plate. On the rock-shaft $b^2$ is secured the arm $c$, having the clamp $c'$ for securing the feeler-arm $c^2$ to the arm $c$. The feeler-arm $c^2$, formed of wire, extends upward and is shaped to pass over the shuttle-box and shuttle and comes in contact with the bobbin $a^5$ in the shuttle when the lay is in its forward position by the action of the coiled spring $c^3$ on the rock-shaft $b^2$. This spring is attached at one end to the collar $c^4$, adjustably secured on the rock-shaft $b^2$ by a set-screw, and has its other end resting on the plate $b$. The arm $c$ is connected to the forward end of the arm $b^4$ by the arm $b^9$, having the slot $b^{10}$. This arm $b^9$ is pivotally secured at its lower end to the arm $b^4$ and is attached to the arm $c$ at its upper end by the stud $c^5$ on the arm $c$ working in the slot $b^{10}$ in the arm. The connecting-arm $c^6$ pivots on the rock-shaft $b^2$ and is adjustably secured to the arm $c^7$ (secured on the rock-shaft $b^2$) by the bolt $c^8$ passing through the slot $c^9$ in the upper end of the connecting-arm $c^6$, as shown in Fig. 7. The connecting-arm $c^6$ extends downward and forward and has the beveled end $c^{10}$. By this construction the connecting-arm $c^6$ is adjustably secured on the rock-shaft $b^2$ and moves with the feeler-arm $c^2$.

On the top of the breast-beam near the front is secured the plate $d$, having the slide-support $d'$ and the bearings $d^2$ $d^2$ for the rock-shaft $d^3$. The operating-arm $d^4$ extends downward and backward and has the beveled end $d^5$ in a position to engage with the beveled end $c^{10}$ of the connecting-arm $c^6$, the slot $d^6$, and the inwardly-bent upper end $d^7$. On the outer end of the rock-shaft $d^3$ is secured the supporting member $d^8$. The operating-arm $d^4$ is adjustably secured to the rock-shaft $d^3$ through the supporting member $d^8$ by the screw $d^9$ passing through the slot $d^6$ in the operating-arm $d^4$ and the adjusting-bolt $d^{10}$ passing through the end $d^7$ of the operating-arm and bearing on the top of the supporting member $d^8$, as shown in Fig. 8. The lifting-lever $d^{11}$ is secured to the rock-shaft $d^3$ and extends inward over the breast-beam. It is counterbalanced by the coiled spring $d^{12}$, secured to the bearing $d^2$ and to the rock-shaft $d^3$ by attaching one end to the bearing $d^2$ and the other end to the collar $d^{13}$, adjustably secured on the rock-shaft by a set-bolt.

The weft-hammer $e$, pivotally secured to the loom side $a$, has a forward and backward movement from the loom mechanism in the usual way. On the upper end is secured the hook $e'$ in a position to engage with the weft-fork. The split collar $e^2$ is adjustably secured on the weft-hammer by the screw $e^3$ and has the arm $e^4$ extending outward and upward to form the forwardly-projecting end $e^5$, as shown in Figs. 5 and 6. The operating-hook $e^6$ is pivotally secured in the end $e^5$ and has the arm $e^7$ in a position to extend over the lifting-lever $d^{11}$. The operating-hook rests on the arm $e^4$ when the weft-hammer $e$ is in the position as shown as in Fig. 1, the weight of the operating-hook depressing the arm $e^4$ against the tension of the spring $d^{12}$ on the rock-shaft $d^3$. The forward end of the slide $e^9$ has the downwardly-bent end $e^{10}$, engaging with the arm $e^{11}$, secured on the rock-shaft $e^{12}$, supported in bearings on the front of the breast-beam. On the opposite end of the rock-shaft $e^{12}$ is secured the arm $e^{13}$, pivotally secured to the rod $e^{14}$, connecting with the automatic mechanism of the loom for ejecting the old bobbin and replacing it with a full bobbin.

The weft-fork $f$ on the weft-fork slide $f'$ operates when a weft-thread breaks, by the hook $e'$ on the weft-hammer $e$, to move the knock-off bar $f^2$ and throw the shipper-lever $f^3$ to stop the loom in the usual way.

In the operation of the mechanism the cam-plate $b^6$ on the loom side $a$ gives to the arm $b^4$ an up-and-down movement by the forward and backward movement of the lay. In the backward movement of the lay the roll $b^5$ on the arm $b^4$ goes upward on the cam-plate, depressing the forward end of the arm $b^4$, the arm $b^9$, and the arm $c$, secured on the rock-shaft $b^2$. This movement raises the feeler-arm $c^2$ from the shuttle and the shuttle-box against the tension of the coiled spring $c^3$ on the rock-shaft $b^2$ and holds the feeler-arm in the raised position until the next forward movement of the lay. When the lay has nearly reached its forward position, the roll on the arm $b^4$ goes down, the cam-plate $b^6$ allowing the forward end of the arm $b^4$ and the arm $c$ to go upward. The tension of the coiled spring $c^3$ carries the feeler-arm $c^2$ over the shuttle-box and shuttle and into contact with the filling-bobbin $c^5$ in the shuttle. These movements are repeated in the backward and forward beats of the lay until the weft-thread on the bobbin is nearly exhausted, when the feeler-arm may come into contact with or pass by the nearly-exhausted filling on the bobbin. At this point the inward movement of the feeler-arm $c^2$ has raised the connecting-arm $c^6$. The beveled end $c^{10}$ of the connecting-arm engages with the beveled end $d^5$ of the operating-arm $d^4$ and lifts the end of the operating-arm. This upward movement of the operating-arm on the rock-shaft $d^3$ raises the lifting-lever $d^{11}$, secured to the rock-shaft. The lifting-lever engages with the arm $e^7$ on the hook $e^6$ and raises the hook to engage with the hook $e^8$ on the slide $e^9$. The forward movement of the weft-hammer $e$, on which is the hook $e^6$, carries with it the slide $e^9$, with the downwardly-bent end $e^{10}$ forcing the arm $e^{11}$ on the rock-shaft $e^{12}$ outward and depressing the arm $e^{13}$ and the rod $e^{14}$ on the opposite side of the loom. The rod $e^{14}$ operates the automatic bobbin-changing mechanism of the loom to eject the old or nearly-exhausted bobbin and replace it with a full bobbin without stopping the loom. When the weft-thread breaks, the weft-fork $f$ engages with the hook $e'$ on the weft-hammer $e$. The forward movement of the weft-hammer carries with it the weft-fork slide $f'$ and moves the knock-off bar $f^2$ to throw the shipper-lever $f^3$ and stop the loom in the usual way. When the shuttle is at the battery or right-hand side of the loom and the weft-hammer cam is at its highest point, the hook $e^6$ on the weft-hammer $e$ will be in its extreme forward position, bringing the arm $e^7$ on the hook over the depression $d^{14}$ in the lifting-lever $d^{11}$. The coiled spring $d^{12}$ on the rock-shaft $d^3$ raises the lifting-lever $d^{11}$ and the operating-arm $d^4$, preventing the beveled ends $c^{10}$ and $d^5$ from wearing by coming into contact except when the bobbin is nearly empty.

By the use of our improved mechanism on automatic looms a more perfect weave is attained by ejecting the nearly-exhausted bobbin before it has run out and replacing it with a full bobbin, thereby preventing a partial weave of the end of the weft-thread in the cloth or no weave by the absence of the weft-thread, as is done in automatic looms where the weft-thread is allowed to run entirely out before being replaced by a full bobbin, the absence of the weft-thread operating, through the weft-fork to operate the automatic bobbin-changing mechanism.

It is evident that our improved mechanism could be used on any automatic loom where the bobbin is automatically ejected from the shuttle and replaced by a full bobbin and that the parts of the mechanism could be changed to conform to the existing parts of a loom without materially affecting the spirit of our invention.

Having thus described our invention, we claim as new and desire to secure by Letters Patent—

1. In a weft-replenishing mechanism for an automatic loom, an open-top shuttle-box, a feeler-arm pivotally secured to the lay and adapted to move inward to the bobbin in the shuttle by a spring at the forward beat of the lay, a cam-plate on the loom side, means for connecting the feeler-arm with the cam-plate to raise the feeler-arm from the shuttle-box on the backward beat of the lay, a connecting-arm adapted to move with the feeler-arm, means for adjusting the connecting-arm, a rock-shaft on the breast-beam, an operating-arm on the rock-shaft in a position to engage with the connecting-arm on the forward beat of the lay and when the feeler-arm has reached its inward limit on the bobbin, means for adjusting the operating-arm, a lifting-lever on the rock-shaft, a weft-hammer having a pivoted operating-hook engaging with the lifting-lever and a hook to engage with the weft-fork, a slide on the breast-beam having a hook to engage with the operating-hook on the weft-hammer, an arm engaging with the slide and secured on a shaft having means to operate the bobbin-changing mechanism of the loom to eject the old bobbin before it is exhausted and replace it with a full bobbin without stopping the loom, and means for stopping the loom when the weft-thread breaks, for the purpose as described.

2. In a weft-replenishing mechanism for an automatic loom, the combination with mechanism controlling the bobbin-changing mechanism to eject the old bobbin before it is exhausted and replace it with a full bobbin, of means for adjusting the connecting-arm $c^6$ pivoted on the rock-shaft $b^2$ consisting of the arm $c^7$ secured on the rock-shaft $b^2$ and having the bolt $c^8$ passing through the slot $c^9$ in the upper end of the connecting-arm $c^6$, as described.

3. In a weft-replenishing mechanism for an automatic loom, the combination with mechanism controlling the bobbin-changing mechanism, of means for adjusting the operating-arm $d^4$ on the rock-shaft $d^3$, consisting of the slot $d^6$ in the arm, the inwardly-bent upper end $d^7$, the supporting member $d^8$ on the rock-shaft, the screw $d^9$ passing through the slot $d^6$ into the supporting member $d^8$, and the adjusting-bolt $d^{10}$ in the end $d^7$ bearing on the supporting member $d^8$, as described.

4. In a weft-replenishing mechanism for an automatic loom, the combination with mechanism controlling the bobbin-changing mechanism, of the weft-hammer $e$ having the hook $e'$, the collar $e^2$ secured on the weft-hammer by the screw $e^3$, the arm $e^4$ on the collar having the end $e^5$ and the operating-hook $e^6$ pivotally secured in the end $e^5$ and having the arm $e^7$ to engage with the lifting-lever $d^{11}$, as described.

In testimony whereof we have signed our names to this specification in the presence of two subscribing witnesses.

GEORGE H. PARKER.
WILLIAM A. TWISS.

Witnesses:
MYRA C. HEYER,
GEORGE N. GARDINER.